United States Patent [19]
Rennick

[11] 3,925,605
[45] Dec. 9, 1975

[54] DROPOUT DETECTOR FOR VIDEO DISC PLAYBACK

[75] Inventor: John L. Rennick, Elmwood Park, Ill.

[73] Assignee: Zenith Radio Corporation, Chicago, Ill.

[22] Filed: June 28, 1974

[21] Appl. No.: 484,041

[52] U.S. Cl... 178/6.6 R; 178/6.6 DC; 178/6.6 DD; 178/6.7 A; 179/100.3 V; 360/38
[51] Int. Cl.² ........................................... H04N 5/76
[58] Field of Search ........ 178/6.6 R, 6.7 A, 6.6 DC, 178/6.6 DD; 179/100.3 V, 100.4 R, 100.4 M; 360/38

[56] References Cited

OTHER PUBLICATIONS

Signal Processing in the Philips "VLP" System, van den Bussche et al., Philips Tech. Rev. 33, pp. 181–185, 10/73.

*Primary Examiner*—Raymond F. Cardillo, Jr.
*Attorney, Agent, or Firm*—John J. Pederson; Cornelius J. O'Connor

[57] ABSTRACT

A video disc playback system develops a frequency modulated carrier wave in reading out the information stored in a video disc. A linear detector derives the program information from the carrier for utilization. A dropout detector, having a nonlinear characteristic particularly in the frequency range representing desired program information, develops a control signal only during operating intervals in which frequency deviations of the carrier beyond the frequency range devoted to program information indicate dropout conditions. That control signal is used to inject previously stored program information in the dropout intervals in order to accomplish dropout compensation.

3 Claims, 12 Drawing Figures

DROP OUT DETECTOR

VIDEO DETECTOR

DROPOUT DETECTOR FOR VIDEO DISC PLAYBACK

BACKGROUND OF THE INVENTION

Video discs have been proposed to be used analogously to sound records but, in this case, to play back both video and audio information through a television receiver. The use of such discs enhances the value of the television instrument in the home and offers the attractive possibility of unique programming directed more to individualized preferences than commercial television broadcasts.

Usually a video disc has a storage or record track in the form of a multi-turn spiral and it is generally fabricated under the control of a carrier wave signal frequency modulated with the program to be recorded. In its most attractive implementation the carrier signal is modulated with luminance, chroma, synchronizing and audio components constituting interlaced fields of video lines to the end that the carrier derived from reading the record may be transcoded to a signal which in all material respects is the same as a color television broadcast and, therefore, is suitable for application to the antenna terminals of a color receiver.

Systems employing video discs are usually of the pressurized, capacitive, or optical type. In the pressurized system, a pick up device mechanically tracks the record groove and sustains pressure variations which are translated into a modulated carrier wave signal corresponding to the stored information. The capacitive approach is similar in that the record track is mechanically tracked by a pick up which, in conjunction with a conductive layer of the disc, experiences variations in capacitance to develop a modulated carrier representing the stored information. The optical system differs from the first two in having no mechanical coupling with the disc. Instead, it reads the disc with a light or laser beam to develop a frequency modulated carrier.

Each of these systems may be utilized to produce acceptable reproductions of video discs but they all suffer in varying degrees from what are termed dropouts. A dropout is a temporary loss of or interruption in the video information in the reproduced image and has a width of one video line but is random in length or duration. Most frequently, it appears black on the image screen and sometimes has a white leading edge. In length it is usually between one and one and a half microseconds. Other dropouts have been encountered, however, which are very short in duration; corresponding to a single cycle of the modulated carrier having a means frequency of 7 mHz, and appear as a white distortion rather than black. For the most part, dropouts are caused by abnormalities or surface imperfections of the video disc or record. The most common cause is a scratch or family of scratches of random duration but another frequent cause of dropouts is the presence of unwanted particulate matter on the surface of the disc or perhaps even within the disc material, especially for an optical system where the disc is transmissive to the reading beam.

Viewed electrically, the dropouts constitute interruptions of the carrier wave signal which is derived from scanning the disc and which, in the absence of abnormalities causing dropouts, has a constant amplitude although frequency modulated with program information. In practice, the carrier wave may exhibit a low level and low frequency amplitude modulation attributable to imperfections of the system and not representing desired program information. Such imperfections can be readily attenuated or eliminated entirely by the usual limiter which precedes the frequency modulation detector employed in developing the program information. On the other hand, the presence of a dropout condition may be likened to nearly 100 percent amplitude modulation of the carrier wave which obviously cannot be eliminated by previous practices of limiting. Accordingly, it is desirable to provide some means in the system for detecting the presence of dropout conditions and for compensating their effect.

An initial approach is to adopt the detector mechanism employed in magnetic tape systems which suffer from the same sort of imperfections which again are manifest in great reduction in carrier amplitude. The magnetic tape systems achieve correction by the use of an envelope detector operating on the frequency modulated carrier and responsive to the amplitude reduction representing the dropout to derive a control signal to operate a switch. This switch, when operated, injects information from the last or preceding line of video for the duration of the dropout condition and thus attains dropout compensation. Of course, this is an acceptable method of compensation because conventional television signal specifications are such that the video information changes very little on a line-by-line basis.

In the optical video disc system, the record track is a succession of pits or concavities and lands which follow one another in alternation along the storage track. They are of uniform width but variable length to constitute a spatial representation of the frequency modulated carrier under the control of which the disc has been fabricated. One previous approach to dropout compensation is premised on the principle that dropout phenomenon is related to the absence of one or more pits from the record track. The absence of a single pit is reasoned to correspond to a half frequency carrier condition and the absence of two successive pits may be likened to a condition of one-third carrier frequency. With this characterization of the dropout phenomenon a dropout channel may be employed having a low pass input filter which cuts off at half carrier frequency. Such a channel produces an output to actuate the compensation network only in the presence of dropout conditions.

Both prior systems have the undesirable attribute of being sensitive to signal level, that is to say, they exhibit an undesirable level sensitivity. The present invention has much less level sensitivity and is useful for any of the known video disc systems whether they feature pressurized, capacitive or optical pick ups.

Accordingly, it is a general object of the invention to provide a new and improved dropout detector for a video playback system.

It is another object of the invention to provide an improved dropout detector that is useful in a variety of video disc systems and is especially useful for systems of the optical type.

SUMMARY OF THE INVENTION

A dropout detector, embodying the invention, is useful for a system for reading a video record which has a record track constituting a spatial representation of a carrier wave signal angle-velocity-modulated (such as frequency modulated) over a predetermined range of frequencies with desired information. The arrangement comprises means for scanning the record track to develop a carrier wave signal angle-velocity-modulated over that frequency range and representing the desired information. The carrier wave, however, is subjected to frequency excursions outside of that frequency range which excursions may be considered abnormalities representative of undesired information and are manifest as dropouts in an image reproduced under the control of the carrier wave. There are further means in the arrangement, including an angle-velocity-modulation detector having an acceptance bandwidth including the aforesaid frequency excursions and at least a portion of the aforesaid frequency range, for responding to the carrier wave signal to develop a control signal only during operating intervals in which the carrier wave signal experiences such frequency excursions.

In a particular embodiment a frequency modulation detector is used to determine dropout conditions. It has the usual S-shaped discriminator characteristic but positioned in unusual fashion in the frequency spectrum. More particularly, a bend or knee of the characteristic occurs in the frequency range devoted to desired information whereas the extensions of both ends of the knee are linear portions of the characteristic where frequency excursions experienced in dropout conditions fall in the frequency domain. Because of the return bend or particular shape of the frequency characteristic of the discriminator the same polarity of output is obtained and the same control effect derived whether the dropout is manifest by a frequency excursion corresponding to whiter-than-white or to a black level exceeding sync tips of the recorded video program.

BRIEF DESCRIPTION OF THE DRAWINGS

The features of the invention which are believed to be novel are set forth with particularity in the appended claims. The invention, together with further objects and advantages thereof, may best be understood by the reference to the following description taken in conjunction with the accompanying drawings in the several figures of which like reference numerals identify like elements and in which:

DESCRIPTION OF PREFERRED EMBODIMENT

Figure 1:
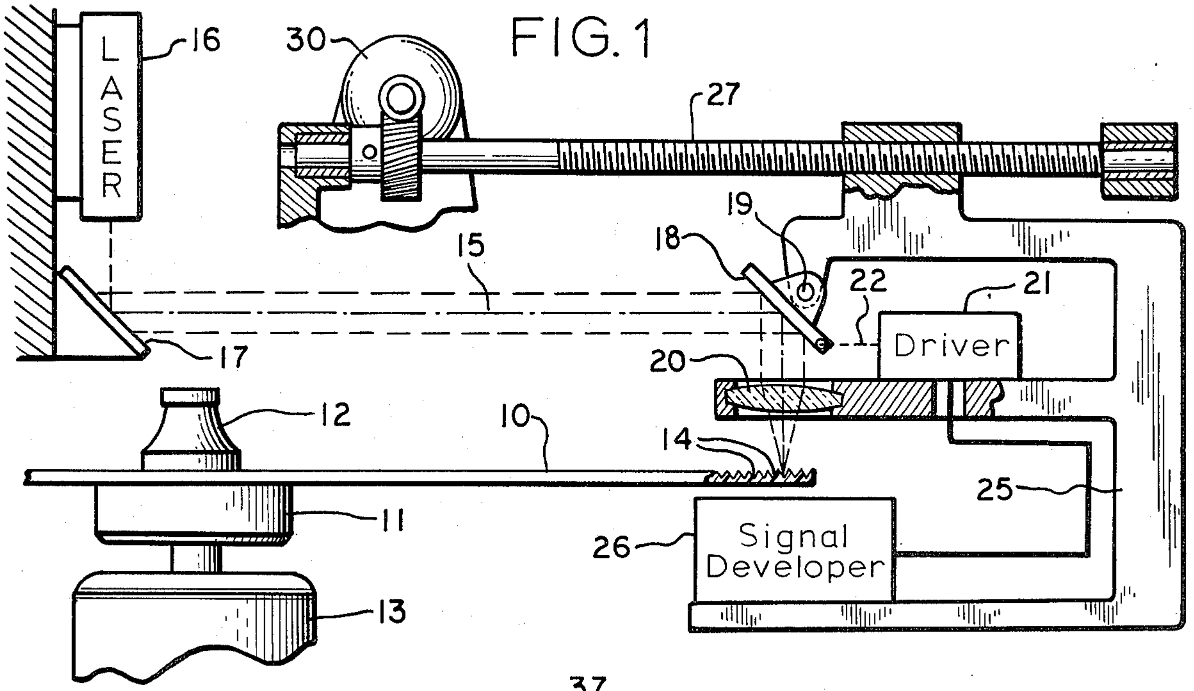
FIG. 1 is a schematic representation of an optical video playback system with which the present invention may advantageously be employed.

The playback system of FIG. 1 reads information stored in a record carrier or video disc 10 of suitable material, such as polyvinyl chloride, which has the capability of storing program information. The information is carried in a multi-turn spiral-shaped track 14 that may be cut mechanically into the surface of the disc or may be chemically inscribed under the influence of a laser beam controlled by a carrier signal frequency modulated with a video program of luminance, chroma, synchronizing and audio components. The program information employed in preparing the disc is typical of that of television systems wherein images are synthesized as interlaced fields of parallel lines of video. It is sometimes convenient to give the components of the program signal, such as the chroma and/or audio components, specifically different freuqncy assignments in the modulated carrier used to prepare the disc than in the carrier transmitted in commercial television broadcasts but this is of no real consequency since the frequency assignments in both cases have such relation that known transcoding networks may easily transform a signal from one to the other. Both methods of disc fabrication are known and since neither constitutes any material portion of the present invention, there is no need to elaborate further other than to say that the recorded information constitutes a spatial representation of a carrier wave signal angle-velocity-modulated (frequency modulated) over a predetermined range of frequencies with desired information. It will be assumed that the carrier has a mean frequency of 7 mHz with sync tips represented by a carrier frequency of 6 mHz and white level by a carrier frequency of 8 mHz.

The disc may be of sufficient thickness to be mechanically rigid in which case it is supported on a turntable in the playback apparatus and the disc is given a conductive coating to operate in the reflective mode. Alternatively, and as indicated in FIG. 1, the disc may be so thin as to be flexible in which case it is supported on a spindle 11, retained in position by a removable cap 12, and driven by a motor 13 which rotates spindle 11 and disc 10 at a relatively high speed, of the order of 1800 rpm, to accomplish what is referred to as flying the disc. Since the record track is a spatial representation of the modulated carrier wave signal under the control of which the track has been prepared, reading of that track with a laser or light beam develops a correspondingly modulated carrier wave.

The means for scanning the record track of disc 10 to develop a frequency modulated carrier wave representing the desired information comprises a laser source 16 which projects a beam 15 of monochromatic coherent light along a path to a final or focusing lens 20 which focuses the reading beam onto track 14 of the disc. The physical relationship of source 16 to lens 20 is of no particular moment since the light path is easily determined by mirrors such as stationary mirror 17 and a movable mirror 18 positioned properly to present the reading beam to focus lens 20. Mirror 18 is displaceable about a pivot or reference axis 19 by a driver 21 coupled to the mirror as indicated by broken construction line 22. Driver 21 is energized by correction signals so that the proper relation of reading beam 15 relative to track 14 is maintained during readout, in a manner presently to be described in at least a general way.

In order to track the record and readout, all segments thereof, it is necessary that the reading spot be moved radially over the disc at the proper speed and this is accomplished by a carriage 25 which supports mirror 18, lens 20, and driver 21 from a threaded shaft 27 which is rotatively driven by a motor 30 to advance carriage 25 radially over the disc. A signal developer 26 is located below disc 10 in alignment with lens 20 which, of course, assumes that the disc is transmissive to the reading beam. The signal developer, as well understood in the art, is a photoreceptor arrangement responsive to light passing through the disc as it is read. A particularly attractive arrangement comprises four photocells arrayed in pairs aligned with one another on opposite sides of a reference plane which is perpendicular to the diameter of disc 10 and tangent thereto at the point of the reading spot. Two of the four photocells, one on either side of the reference plane, have their outputs additively combined in a summing amplifier to supply, in response to scanning of the record track by reading beam 15, a carrier wave signal frequency modulated over the frequency range representing desired program information. The remaining two photocells have their outputs differentially combined in a differential amplifier. The output of that amplifier is a correction signal designating the sense and extent of radial misregistration of the reading beam relative to record track 14. The correction signal is delivered to driver 21 to displace mirror 18 about its axis 19 in the proper sense and amount to maintain optimum radial tracking registration. As thus far described, the optical playback apparatus of FIG. 1 represents a prior art structure which operates satisfactorily to scan or read video disc 10 and develop a frequency modulated carrier wave signal that may be used, after transcoding should that be required, to energize a color receiver for image reproduction. Surface imperfections or other abnormalities of record disc 10 may cause the carrier wave signal developed through scanning of the video disc to be subject to frequency excursions outside of the frequency range devoted to the desired program information which excursions represent abnormalities or what are referred to as dropout conditions. The electrical processing system of FIG. 2 receives the carrier wave from unit 16 and is arranged to detect dropout conditions and achieve dropout compensation.

Figure 2:
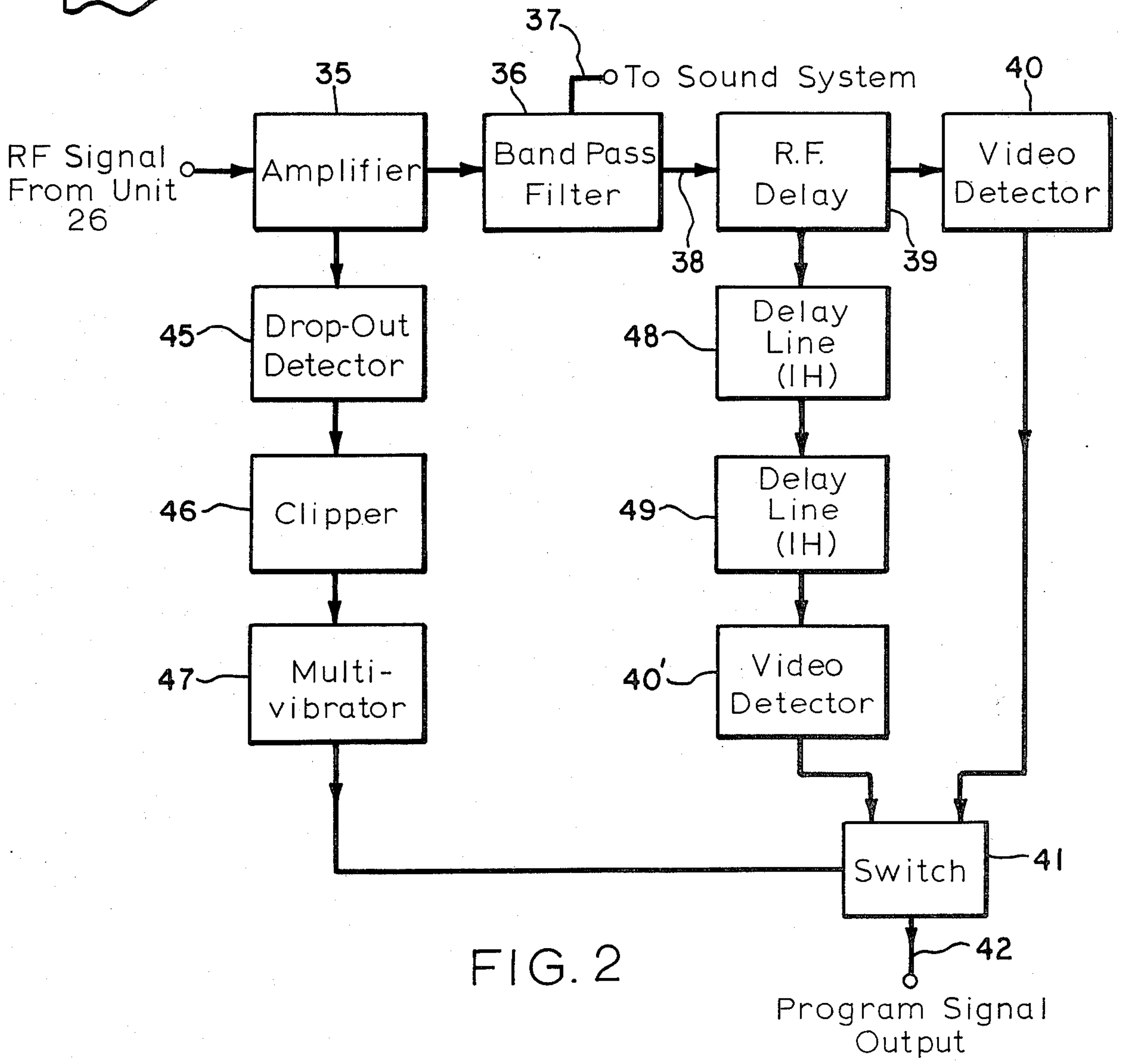
FIG. 2 is a block diagram of a system, including the present invention, for processing the modulated carrier wave signal delivered from the reading head of the playback apparatus of FIG. 1.

The normal signal channel of the system of FIG. 2 comprises an amplifier 35 having an input terminal which receives the modulated RF carrier from unit 16 of the readout apparatus of FIG. 1. The output of amplifier 35 is delivered to a band pass filter 36 having one output 37 which leads to an audio or sound reproducing system (not shown) and a second output 38 leading to a radio-frequency delay line 39 designed to inject a time delay in the video channel of sufficient duration to accommodate actuation of the dropout compensator during dropout conditions. The carrier signal is normally delivered from delay line 39 to a conventional linear video frequency modulation detector 40. This detector in normal operation of the system demodulates the frequency modulated carrier developed in reading disc 10 with beam 15 to supply the program signal through a normally closed section of a switch 41 to an output 42. From this output, the program signal is supplied, after transcoding, to a color television receiver.

A second output of amplifier 35 concurrently delivers the modulated RF carrier from unit 26 to signal translating means, including an angle-velocity-modulated (frequency modulated) detector having an acceptance bandwidth including the frequency excursions of the carrier wave indicative of dropouts and at least a portion, but preferably all, of the frequency range devoted to desired program information. This signal translating means comprises a dropout detection channel responsive to the carrier wave signal to develop a control signal only during operating intervals in which the carrier wave experiences frequency excursions indicative of dropout conditions. More particularly, the dropout detection channel of FIG. 2 is comprised of a dropout detector 45 which delivers an output to a clipper 46. The clipper, in turn, controls a monostable multivibrator 47 which delivers at its output a control signal for actuating a switch 41 from its normal position coupling video detector 40 to output 42 to an alternative position coupling another conventional video frequency modulation detector 40' through a second section of the switch to output 42. Video detector 40' is preceded by two delay lines 48 and 49, each introducing a delay in signal translation of one horizontal line of the program signal. These delay lines are serially connected and feed from a second output of RF delay line 39.

Most of the component parts of the electrical processing system of FIG. 2 are of well-known construction and operation and need not be described in detail. Those that are unique in either structure or operating characteristics will be considered further hereinafter but first the operation of the system will be described simply relying on a functional description of the several components thereof.

As previously indicated, if the system were not subject to abnormalities causing dropout phenomenon, the modulated carrier wave input to amplifier 35 from reading disc 10 would be translated in an entirely conventional manner with the video signal demodulated in video detector 40 to deliver the program signal to output 42. Concurrently, the carrier signal is extracted at terminal 37 and delivered to an audio system for reproduction along with reproduction of the video information. Of course, the RF signal is simultaneously applied to the dropout channel including detector 45 and to the parallel channel including delay lines 48, 49 and detector 40' but during normal operating conditions in which no dropout phenomenon is encountered these channels are disconnected from output 42 by switch 41 and may, therefore, be ignored. The presence of dropout conditions, however, modifies the operation of the electrical processing system as required to obtain compensation for the dropouts.

Dropout detector 45 has an acceptance bandwidth which preferably extends beyond both limits of the frequency range devoted to program information and which also encompasses the frequency excursions to which the carrier signal is subject, indicative of dropout conditions. Additionally, the sensitivity of detector 45 to the frequency excursions attendant to dropout conditions is substantially greater than its sensitivity to frequencies within the range devoted to program information. For this reason, there is a distinctly greater signal output from detector 45 in response to the frequency excursions of the carrier wave that are occasioned by dropout phenomenon than to frequencies assigned to the program information. A clipping level within clipper 46 is adjusted to, in effect, cause an output to be obtained from detector 45 only in response to the frequency excursions denoting dropout conditions. The output thus selectively obtained from clipper 46 actuates multivibrator 47 from its stable to its unstable operating condition where it remains until the signal from clipper 46 terminates. At that time and under the control of its own internal time constant in multivibrator returns to its initial stable condition. This flip-flop action develops a control signal or pulse which is delivered to switch 41. For the duration of that pulse the signal path from detector 40 to output 42, which is normally closed, is interrupted and in its place the normal interrupted signal path from detector 40' to output 42 is enabled. While detector 40' is operatively connected with output 42, a segment of a preceding line of video information derived through units 39, 48, and 49 is supplied to output 42. In this fashion, video information is present at output 42, whereas otherwise the information available at that output would be the undesired information, not representative of the program but rather representative of and resulting in dropout conditions of the system including the image reproducer. On the image screen dropouts resemble a loss of video and may appear as line segments that are black, with or without a white leading edge or they may appear white. It will be apparent since the video information supplied through detector 40' has experienced delay in successive delay lines 48 and 49 that it is delayed by two, as distinguished from one, video line. This is necessary for the arrangement shown in order to preserve the desired phase relations of not only the luminance but also the chroma information supplied to the image reproducer. It will also be appreciated that the relatively small delay introduced by RF delay 39 is simply that which is required to permit the dropout detection channel to detect a dropout condition and to operate switch 41 in the presence of dropout conditions and before they are able to reach output 42 through the normal video detector 40. Such switch 41 is actuated to transfer output 42 from detector 40 to detector 40' under the control of a pulse from monostable multivibrator 47, the switch is permitted to return to its normal position, connecting detector 40 to output 42, directly after the termination of the dropout condition. This is because the control pulse from multivibrator 47 is of controllable duration, being itself determined by a detected dropout and having a length equal to or slightly greater than the dropout.

For the most part, even unconventional components of the electrical processing system of FIG. 2, such as dropout detector 45, may be constructed of commercially available integrated chips with appropriate connections to various of the terminals that they make available. By way of illustration, FIG. 3 contains the necessary circuitry required for dropout detector 45 and clipper 46 as well as an intervening amplifier and level shifter 50. Each of these components is enclosed within its own broken-line rectangle in FIG. 3.

Figure 7:
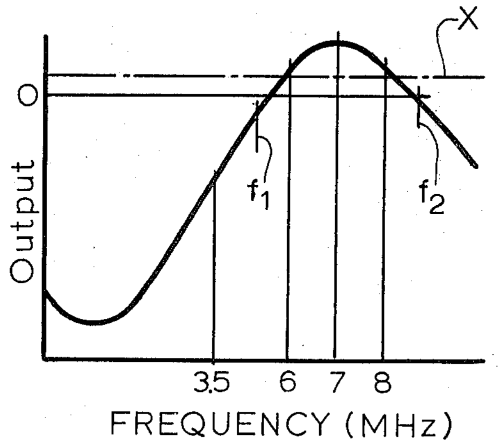

The bulk of the circuitry of the dropout detector is a 90° phase shifting network enclosed within still another broken-line rectangle 50 and a 14-terminal integrated chip 52 available from Texas Instrument Company of Dallas, Texas, under type designation SN76670N. Network 51 is a low pass filter having inductance and capacitance elements of the value, and interconnected in the manner shown, and exhibiting a 90° shift, for the assumed signal conditions, at about 3.5 mHz. The combination of phase shifter 51 and chip 52 presents an S-shaped discriminator characteristic of the type represented in FIG. 7. It is predicated on the assumed carrier; namely, a mean carrier wave frequency of 7 mHz and a deviation frequency range between 6 and 8 megacycles assigned to shade values extending from sync tips (which is at least black level but usually extending slightly beyond black in the blacker than black direction) to white level, respectively. This frequency range falls within the bend or knee of the characteristic, whereas other frequency values, such as those designated $f_1$ and $f_2$ in FIG. 7 representing frequency excursions denoting dropout conditions, fall on linear portions of the characteristic which constitute extensions of the knee or bend encompassing the frequency range assigned to the desired program information. An unusual property of the dropout compensator is reflected in this characteristic in its response to frequency excursion $f_1$, which has a value less than 6 megacycles and, therefore, represents blacker than black, and frequency excursion $f_2$, which has a value exceeding 8 megacycles and, therefore, denotes a shade that is whiter than white. Since the characteristic has, in effect, a return bend or fold-over portion both frequency values produce the same polarity output from dropout detector 45.

Figures 3, 4:
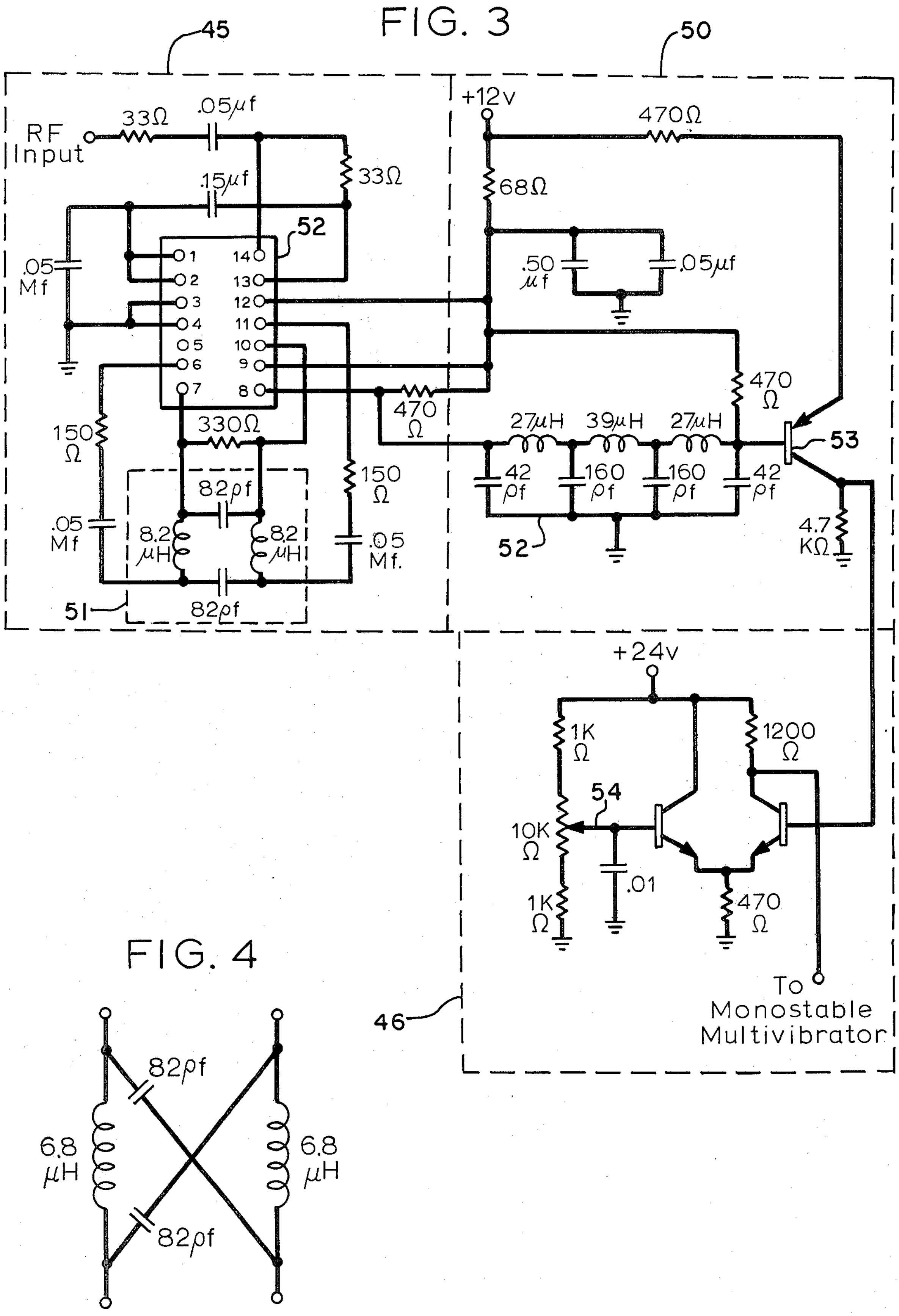
FIG. 3 represents the circuitry of the dropout detector, an amplifier and level shifter as well as an adjustable clipper included in the processing circuitry of FIG. 2.
FIG. 4 is the circuitry of a phase shifting network that is used in the signal detector of the playback system as distinguished from the dropout detector.
Figure 5:
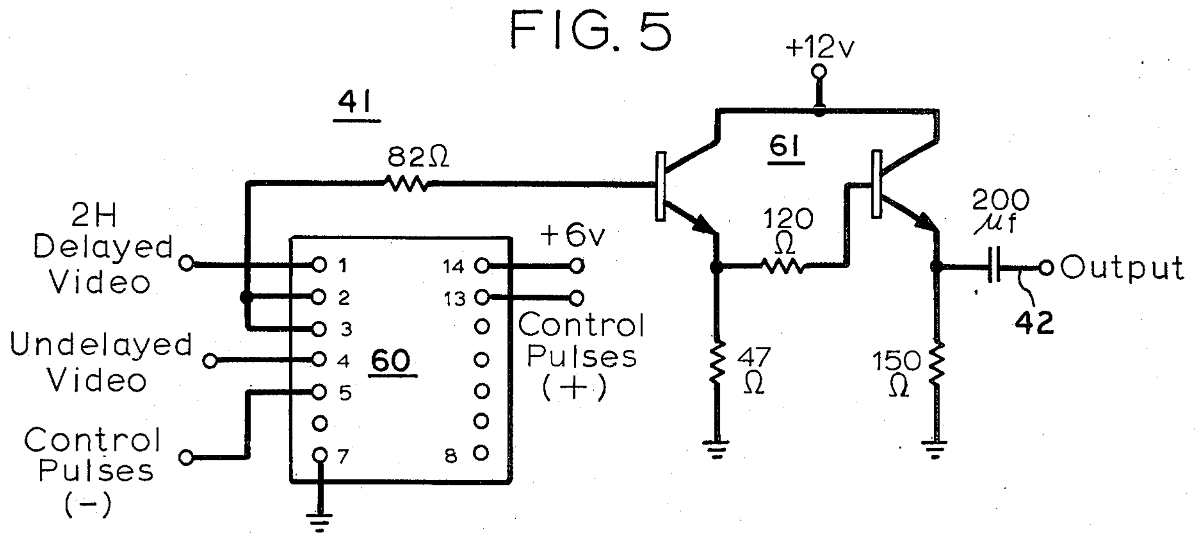
FIG. 5 represents the make up of a video switch to be operated to achieve dropout compensation.

The output from dropout detector 45 is derived at terminal 8 and supplied through a carrier suppression filter 52 to the base of a transistor 53. The circuitry of this transistor is simply that of an amplifier which also achieves a desired shift in d.c. level. The output from amplifier 53 is supplied to a conventional clipper 46 having two transistors with common emitter circuits. The base of one transistor connects with a potentiometer 54 through which the clipping level may be established and the output is delivered to monostable multivibrator 47 from the circuit point designated. The other circuit components of FIG. 3 are shown as to connection and value and represent the connections necessary for biasing, bypassing, etc. in units 45, 46 and 50. If the clipping level of unit 46 is established at reference X of FIG. 7, the clipper constitutes an amplitude-selective means for deriving a control signal in the dropout channel only in response to those frequency excursions of the carrier wave experienced during dropout conditions. Moreover, the output obtained is of the same polarity whether the frequency excursions of the carrier signal correspond to blacker than black or whiter than white.

In establishing the clipping level X due regard must be had to whether or not the system employs preemphasis. In the absence of preemphasis, the reference may be adjusted to a level close to but just below sync peaks, whereas if preemphasis is practiced, the reference must be lower since preemphasis occasions transients at the edges of the sync tips and they must be ignored and not interpreted as indications of a dropout condition.

Figure 8:
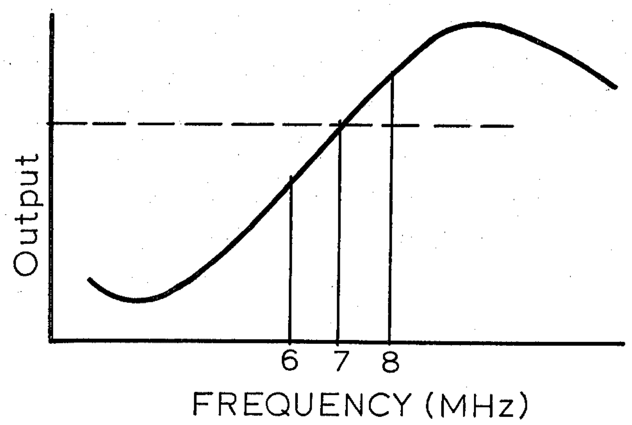
FIGS. 7 and 8 are discriminator characteristics of the dropout detector and signal detector, respectively.

The circuitry of video detectors 40 and 40' is the same as that shown for unit 45 in FIG. 3 except for the 90° phase shift network 51. For the conventional video detector, the phase shift network of FIG. 4 is employed. It is an all pass network and causes the conventional detector to have the frequency characteristic of FIG. 8. Comparison of the frequency discriminator characteristics of FIGS. 7 and 8 makes clear that the linear portions of the characteristic of dropout detector 45 are sharper than those for the conventional detector. This is desirable because it results in the dropout detector being more sensitive to frequency excursions of the carrier denoting dropout than its response to the range of frequencies devoted to program information. In other words, it facilitates recognition and distinguishing dropout conditions from normal signal translating conditions of the system.

Switch 41 is likewise formed of an IC chip 60 distributed by Radio Corporation under type designation CD4016AE. This, too, is a 14-terminal chip and, as indicated by the legends, the delayed video from detector 40' is supplied to terminal 1, the undelayed video from detector 40 is applied to terminal 4 and control pulses from multivibrator 47 are applied to terminals 5 and 13. The polarity designation shows these pulses to be applied to terminals 5 and 13 with opposite polarities and, therefore, the multivibrator shall include an amplifier that delivers a balanced output. An output from switch 41 is obtained from terminals 2, 3 and supplied to output 42 through a conventional form of transistor amplifier 61.

In normal operations, terminal 4 is closed within chip 60 to terminal 3 in order that the undelayed video may be directed to output 42 which is typical of normal operations. This is accomplished by the internal circuitry and biasing of the chip. In the presence of dropout conditions, a controlled pulse of negative polarity from multivibrator 47 is delivered to terminal 5 and its result is to open or disengage terminals 3 and 4, interrupting the translation of undelayed video internally of chip 60. Simultaneously, the same control pulse but of positive polarity is delivered to terminal 13 and its effect is to close terminal 1 internally of chip 60 to terminal 2. As a consequence, the delayed video supplied to chip 60 is delivered to output 42 in place of the undelayed video for a period of time corresponding to the duration of the control pulses applied to terminals 5 and 13. From the discussions above, it will be understood that the pulse duration is at least equal to and possibly slightly longer than the duration of the dropout condition which is manifest from the output produced in the dropout channel in the presence of such conditions. Upon the termination of the control pulse, normal operating conditions are restored with undelayed video again supplied from terminals 3 and 4 to output 42 and with the delayed video interrupted internally of chip 60.

Figure 6:
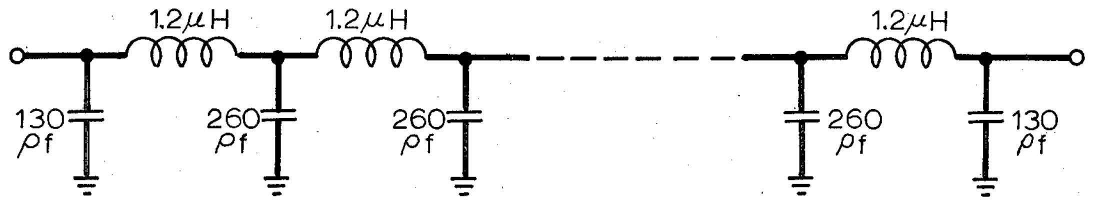
FIG. 6 is the circuitry of a RF delay line useful in the processing system of FIG. 2.

The circuitry of RF delay line 39 is simply that of a well-known constant K filter, shown in FIG. 6, having a number of sections commensurate with the desired delay. Practical and satisfactorily operative embodiments of the electrical processing system of FIG. 2 have made use of a 10 section filter having a cut off frequency of 18 mHz. The delay realized was 0.2 microseconds.

Figure 9C:
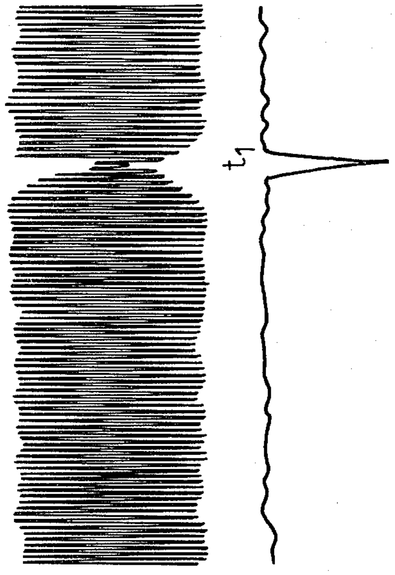
FIGS. 9*a*–9*d* are waveforms useful in understanding the operation of the dropout detector.
Figure 9D:
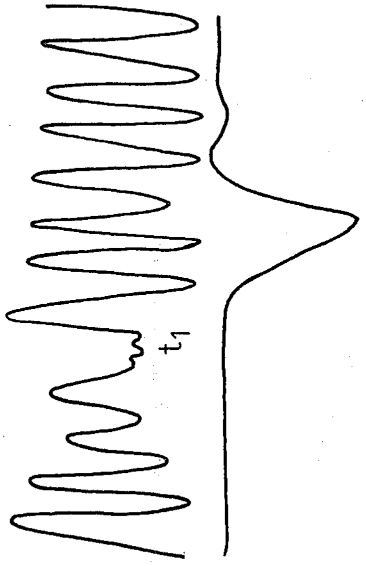
Figure 9A:
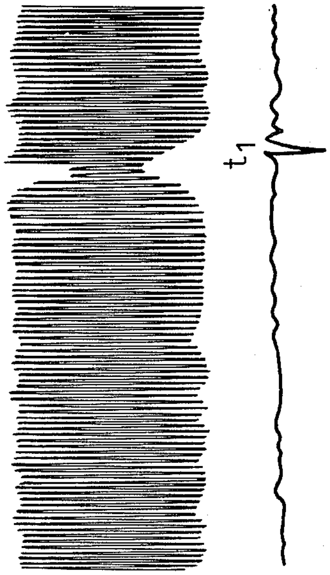
Figure 9B:
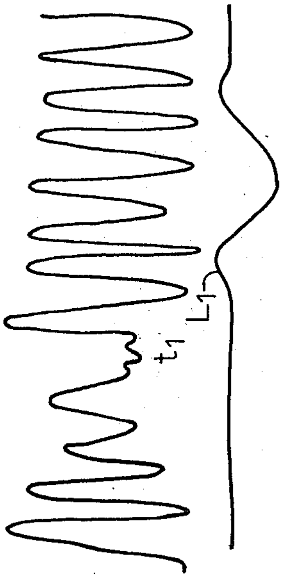

Further understanding of the function of the dropout channel, as constrasted with the normal signal channel including detector 40, may be derived from the scope pictures of FIGS. 9*a*–9*d*. The upper waveform of FIG. 9*a* represents a segment of the RF signal applied to video detector 40. Since this is a frequency modulated carrier, the low level amplitude variations are simply imperfections of the system but the pronounced amplitude reduction at time $t_1$ indicates a frequency excursion of the carrier wave which, unless compensated, would manifest itself in the reproduced image as a dropout. The lower curve of the same figure is the detected output of the linear detector 40. Postive-going amplitude excursions of the detected signal represent shade values in the white direction and negative-going amplitude variations denote shade values in the black direction.

The curves of FIG. 9*a* are small segments of the curves of FIG. 9*a* including time-interval $t_1$ and reproduced on an expanded time base. Examination of the lower curve in this figure makes clear that the frequency excursion of the dropout condition has a leading edge $L_1$ corresponding to a white shade level, while most of the detected signal during dropout is black.

The curves of FIG. 9*c* are the same as those of FIG. 9*a* except that they are taken at the input and output, respectively, of dropout detector 45. Similarly, the curves of FIG. 9*d* have a corresponding relationship to those of FIG. 9*b*. The curves in FIGS. 9*c* and *d* emphasize unique characteristics of the dropout detector. The discriminator characteristic of FIG. 7, as explained above, exalts the detected output of dropout detector 45 in response to those frequency excursions of the carrier manifesting dropout conditions. The curves of FIGS. 9*c–d* also make clear that the leading white-going segment $L_1$ of the detected signal described in conjunction with the lower curve of FIG. 9*b*, in fact, is converted to a negative-going output in dropout detector 45. This conversion of a white-going signal representation in the output of conventional detector 40 during dropout conditions to black-going signal representations in the output of dropout detector 48 is unique. It permits more complete dropout compensation than obtainable with prior art schemes, especially those that rely on envelope detection for dropout recognition.

While there has been described a particular embodiment of the present invention, it is apparent that changes and modifications may be made therein without departing from the invention in the broader aspects. The aim of the appended claims, therefore, is to cover all such changes and modifications as fall within the true spirit and scope of the invention.

What is claimed is:

1. In a video player for developing a television image from a recorded carrier wave signal which is angle-velocity-modulated over a predetermined range of frequencies in accordance with desired information, said carrier wave signal being subject to frequency excursions outside of said frequency range which excursions represent abnormalities and undesired information, a dropout compensator comprising:

angle-velocity-modulation detector means having an amplitude-versus-frequency response characteristic which has a knee extending over a band of frequencies of a width corresponding to that of said predetermined frequency range;

means for impressing said carrier wave signal on said angle-velocity-modulation detector means with the predetermined frequency range of the carrier wave signal substantially centered on said knee of said amplitude-versus-frequency response characteristic;

amplitude-clipping means coupled to said angle-velocity-modulation detector means for responding to said carrier wave signal to develop a control signal only during operating intervals in which said carrier wave signal experiences said frequency excursions;

and means for utilizing said control signal for substantially eliminating visible dropouts from said television image.

2. A dropout compensator according to claim 1, in which the amplitude-versus-frequency response characteristic of said angle-velocity-modulation detector means comprises substantially linear portions extending in the same direction from both sides of said knee, whereby frequency excursions in said carrier wave signal beyond said predetermined range of frequencies result in said control signal having a given polarity which is independent of the direction of departure of said frequency excursions from said predetermined frequency range.

3. In a video player for developing a television image from a recorded carrier wave signal which is frequency modulated with brightness information over a predetermined frequency range, a dropout compensation system for substantially eliminating dropouts from said reproduced image, which system comprises:

means, including a delay line and at least one frequency discriminator having a linear amplitude-versus-frequency response characteristic throughout said predetermined frequency range, for developing a principal program signal and a delayed program signal;

dropout detector means comprising an additional frequency discriminator having an amplitude-versus-frequency response characteristic with a knee substantially centered with respect to said predetermined frequency range and having substantially linear portions extending in the same polarity from opposite sides of said knee;

amplitude-selective means coupled to said dropout detector means for developing a control signal in response to any frequency excursion beyond said predetermined frequency range;

and means responsive to said control signal for substituting said delayed program signal for said primary program signal during intervals of said excursions to substantially eliminate dropouts in said reproduced image.

* * * * *